United States Patent
Ozâmiz Fortis

(10) Patent No.: US 8,581,734 B2
(45) Date of Patent: Nov. 12, 2013

(54) MANAGEMENT SYSTEM FOR MANAGING BULK MATERIAL INSIDE A SILO USING A SET OF LOAD CELLS AND AN ACCELEROMETER

(75) Inventors: Pablo Ozâmiz Fortis, Madrid (ES); Antonio Ozamiz Tapia, legal representative, Madrid (ES); Javier Ozamiz Tapia, legal representative, Madrid (ES)

(73) Assignees: Antonio Ozamiz Tapia, Villanueva de la Cañada, Madrid (ES); Javier Ozamiz Tapia, Villanueva de la Cañada, Madrid (ES)

( * ) Notice: Subject to any disclaimer, the term of this patent is extended or adjusted under 35 U.S.C. 154(b) by 60 days.

(21) Appl. No.: 13/004,047

(22) Filed: Jan. 11, 2011

(65) Prior Publication Data
US 2012/0204978 A1    Aug. 16, 2012

(30) Foreign Application Priority Data
Jan. 11, 2010 (ES) ................................. 2010100019

(51) Int. Cl.
*G08B 21/00* (2006.01)
(52) U.S. Cl.
USPC ............................. 340/613; 340/603; 73/296
(58) Field of Classification Search
USPC .................. 340/603, 612–617; 137/551, 552; 73/296
See application file for complete search history.

(56) References Cited

U.S. PATENT DOCUMENTS 3,981,195 A * 9/1976 Forney et al. ................... 73/296

* cited by examiner

*Primary Examiner* — Jeffery Hofsass

(57) ABSTRACT

Management System for managing bulk material inside a silo, that includes: load cells bolted to brackets that are welded to the legs of the silo; an electronic device that measures the weight from the load cells and transmits that information via radio to a gateway that connects to the Internet, a photovoltaic panel to obtain power from solar energy; a set of Supercaps to operate at night-time, a thermistor to compensate for temperature, a XYZ accelerometer to detect movement of the silo and its inclination, a real time clock and a radio communications channel.

21 Claims, 5 Drawing Sheets

MANAGEMENT SYSTEM FOR MANAGING BULK MATERIAL INSIDE A SILO USING A SET OF LOAD CELLS AND AN ACCELEROMETER

FIELD OF THE INVENTION

The present invention relates to a system for managing the bulk material inside a silo, applicable to the industrial hulk material distribution sectors for bulk materials are stored in metal silos, such as for example, cement, plaster, dried mortar, flour, cereal grains, etc. This system, in addition to monitoring the amount of material inside the silo at all times, manages this amount to warn the user of possible out-of-stock risks and helps the user by recommending the optimal time for stocking the silo. Once configured, the system is completely autonomous, i.e., it is self-sufficient in its use, as there is no in need for an electric power supply to operate, or batteries, or an installation of data communication cables for transmitting the information of the weight of the material in the silo to other equipment.

BACKGROUND OF THE INVENTION

Using metal silos in the industry for storing materials such as cement, mortar, plaster, wheat germ, etc., is a common practice. It is very important to know at all times the amount of material in the silo to ensure correct use thereof. There are various techniques for measuring this amount, some of which are based on weighing the silo by installing load cells that adhere to the legs of the silo, others which are based on measuring the fill level by ultrasound, radar, laser, etc. The present invention relates to the former, i.e., silos in which load cells adhered to their legs are installed for measuring by weight the amount of material in the silo.

Today, when a silo is to be implemented for adding therein a measuring system for the purpose of being able to monitor the amount of material therein, the most common practice is to install load cells by screwing them on and adhering them to their legs, which are usually beams with HEB section, or structural metal tubes. These cells are connected to electronic equipment which in turn is connected to the electric network for powering it and communication cables are also installed from the silo to the control cabin for transmitting the data to a weight monitoring system. Today, the most advanced systems have a central server application which connects the sensors of the plant with the sensors of the headquarters through the Internet, or other telecommunication networks.

In the case of moveable silos which are moved with a truck to the work site, the complexity increases since the operation of transporting and erecting the silo causes strong impacts on the legs of the silo which would misadjust and/or break the load cells that are installed thereon. For this reason, movable silos today do not have cells or other measuring systems installed in the legs.

This type of installations will now be described. The silo (1) has therein the bulk to material the amount of which is to be monitored at all times. When it has more material, its legs (3) are subjected to more tension. This tension is measured by installing load cells (4) on said legs. In fixed silos, cells (4) are usually installed on all the legs or only on some of them. The signals of these cells are pulled together in a summation box (5), and the signal (6) is channeled towards the control cabin (2) from this box. Many times Is there is a to pass the cables through underground conduits (9) to take the cables (10) to the electronic control equipment (11) which performs the weighing and displays it on a viewfinder (12). The silo has a motor with a worm screw (7) and electric connection (8) for extracting the material from the silo.

Today, the load cells are screwed onto and adhered to the web of the beam. To that end, there is a need to make two completely normal precise boreholes of the exact diameter in the web of the beam. These boreholes are usually made with a special tool. Once the cell is completely screwed thereon and the cementing adhesive has hardened, they are connected and channeled to the electrical installation. This installation process is laborious, complex and manual, which in business terms means that it is slow and expensive. Furthermore, it complicates the subsequent maintenance as it complicates the replacement of load cells that may be broken.

As a result, nowadays these installations are usually complex and expensive. Many times it is necessary to channel the cables through underground ditches to take the power supply and the data to the control cabin, where the visualization equipment is usually installed so that they are close to the plant operator. As a result, in reality, very few silos have this equipment and as no measuring system is provided, the plant operator tracks the operating procedures to deduce the amount of material in the silo and to decide when he has to order material to fill the silo. If the plant has more than one silo of the same material, this task of the operator is simpler, as he can order material when one silo is emptied, and while the supply arrives, work with the other silo, but in this case the investment for having and maintaining the installation is higher, and the cost of the inventory is also higher, affecting the circulating capital.

SUMMARY OF THE INVENTION

The present invention develops an autonomous system for managing the bulk material in a silo, which is installed in the silo, and is characterized in that:

- An application for managing the silo built into the equipment itself which is installed in the silo, which monitors the fill level at all times, warns of future out-of-stock situations and recommends when to order material to stock the silo.
- There is no need for an electric power supply installation, or battery, or installation of communication cables for transmitting the weighing data.
- It can be installed in moveable silos without risks of breaking and/or misadjustments.
- It can be connected to the Internet through a radio communication gateway. It can report any event through the Internet, even send messages to end users.
- It can be installed at any time without the need to wait for the silo to be emptied, or for its operation to be stopped.
- In moveable silos, it detects if the silo moves, if it moves, it detects if the movement is horizontal or vertical and its inclination.
- It develops a method for installing the load cells which gives robustness to the system, prevents breaks, shortens installation times and improves the subsequent maintenance.
- It detects if the silo is being filled by a supplier other than the corresponding supplier.

Other features and advantages of the present invention will be understood from the following detailed description of illustrative embodiments of its object in relation to the attached figures.

Figure 1:
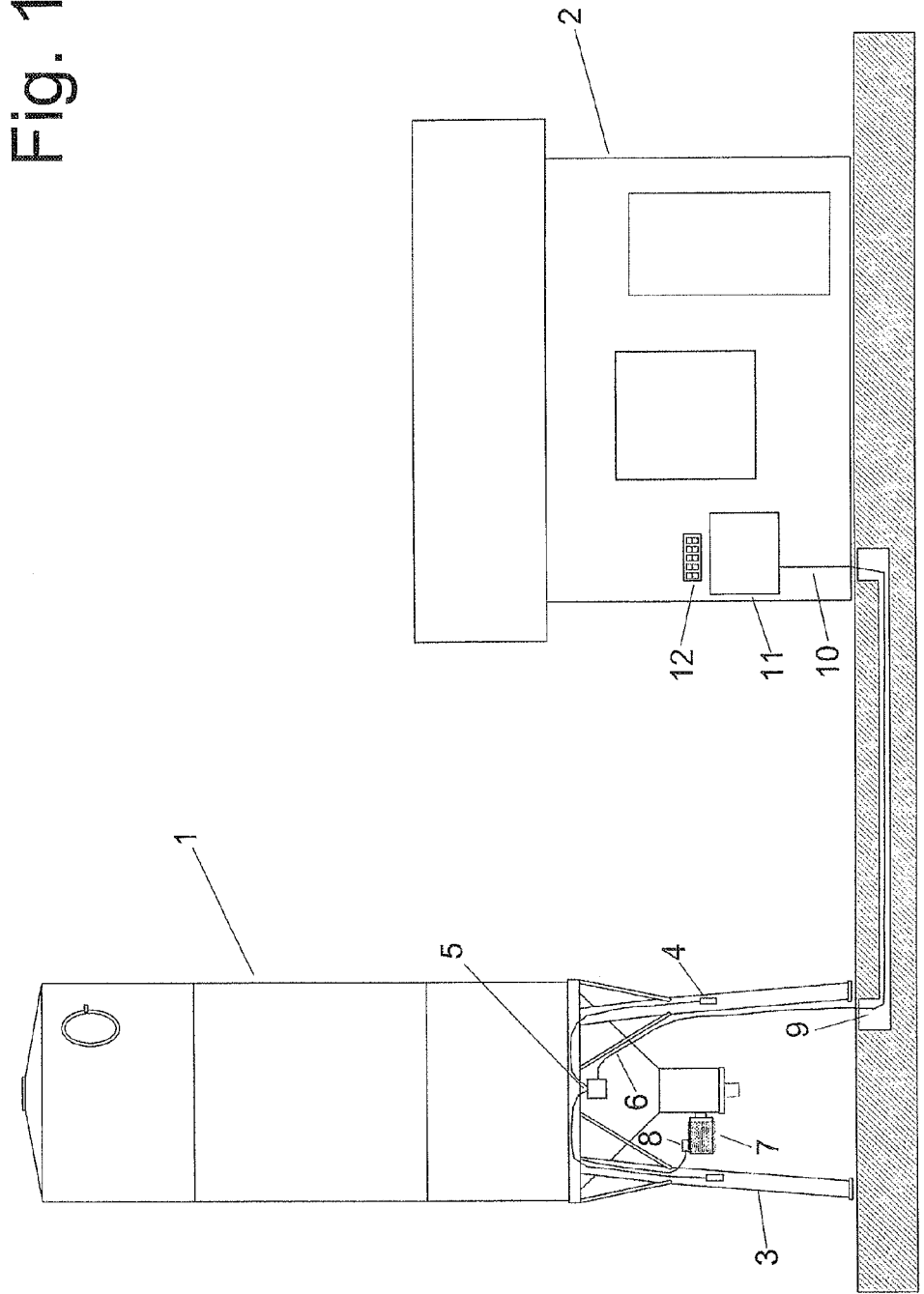
FIG. 1 shows a diagram of a silo in which a conventional system for measuring the weight of the material in the silo according to the prior art of the present invention has been installed. The silo (1) has load cells (4) which measure the weight of all the entire assembly installed on its legs (3). These load cells are pulled together in the summation to box (5) and the total analog signal (6) is channeled by means of an underground ditch (9) to the control cabin (2) to which the cables of the silo (10) which are connected to the electronic equipment (11) which in turn has a weight viewfinder (12) reach.
Figure 2:
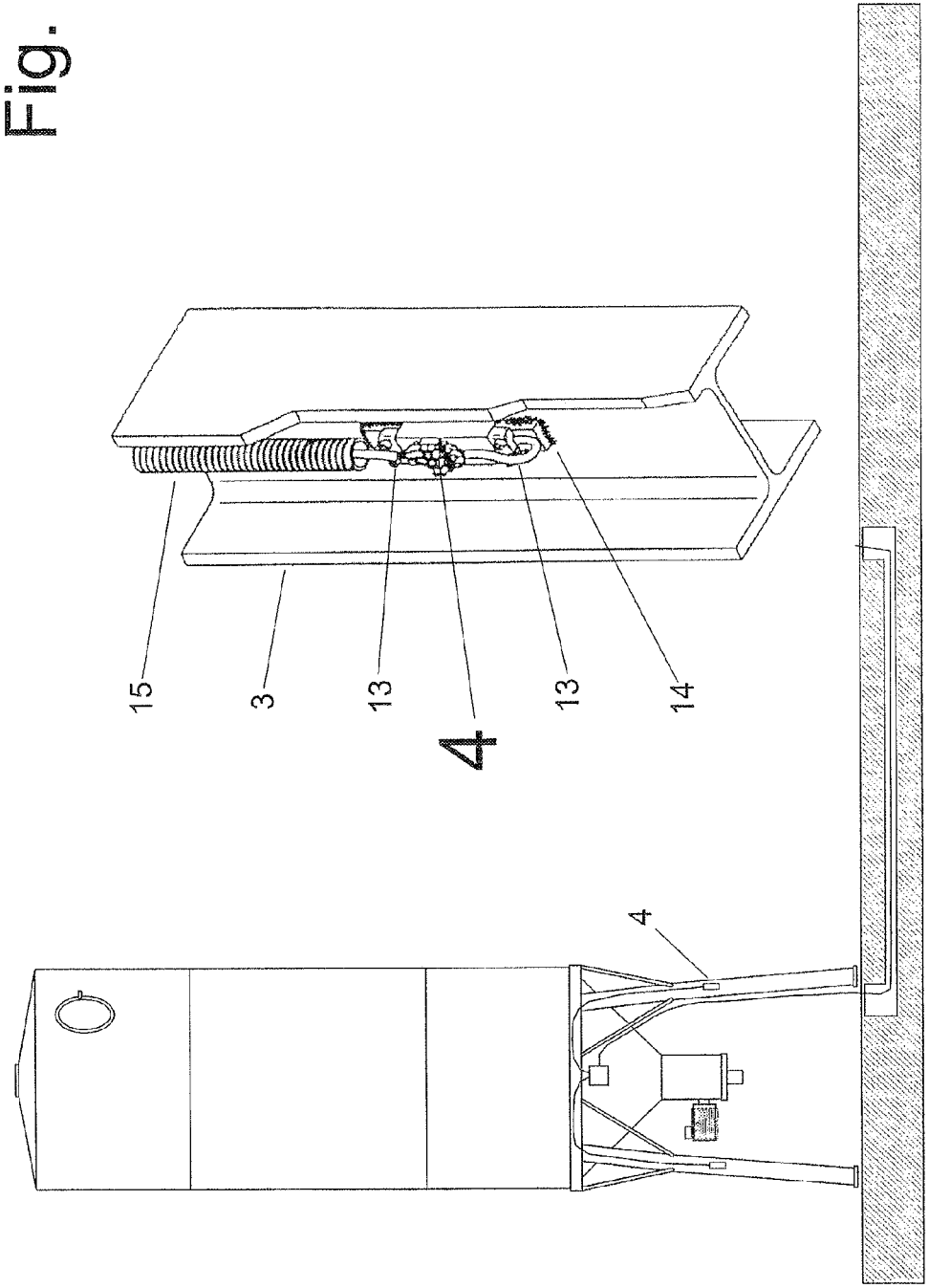
FIG. 2 shows a diagram of a load cell (4) installed on one leg of a silo (3), which in this example is an HEB 140 beam, according to the prior art described in the present is invention. The cell is screwed onto and also adhered (14) to the web of the beam at its two ends (13). The cell is connected to the summation box (5) by means of a duct cable (15).
Figure 3:
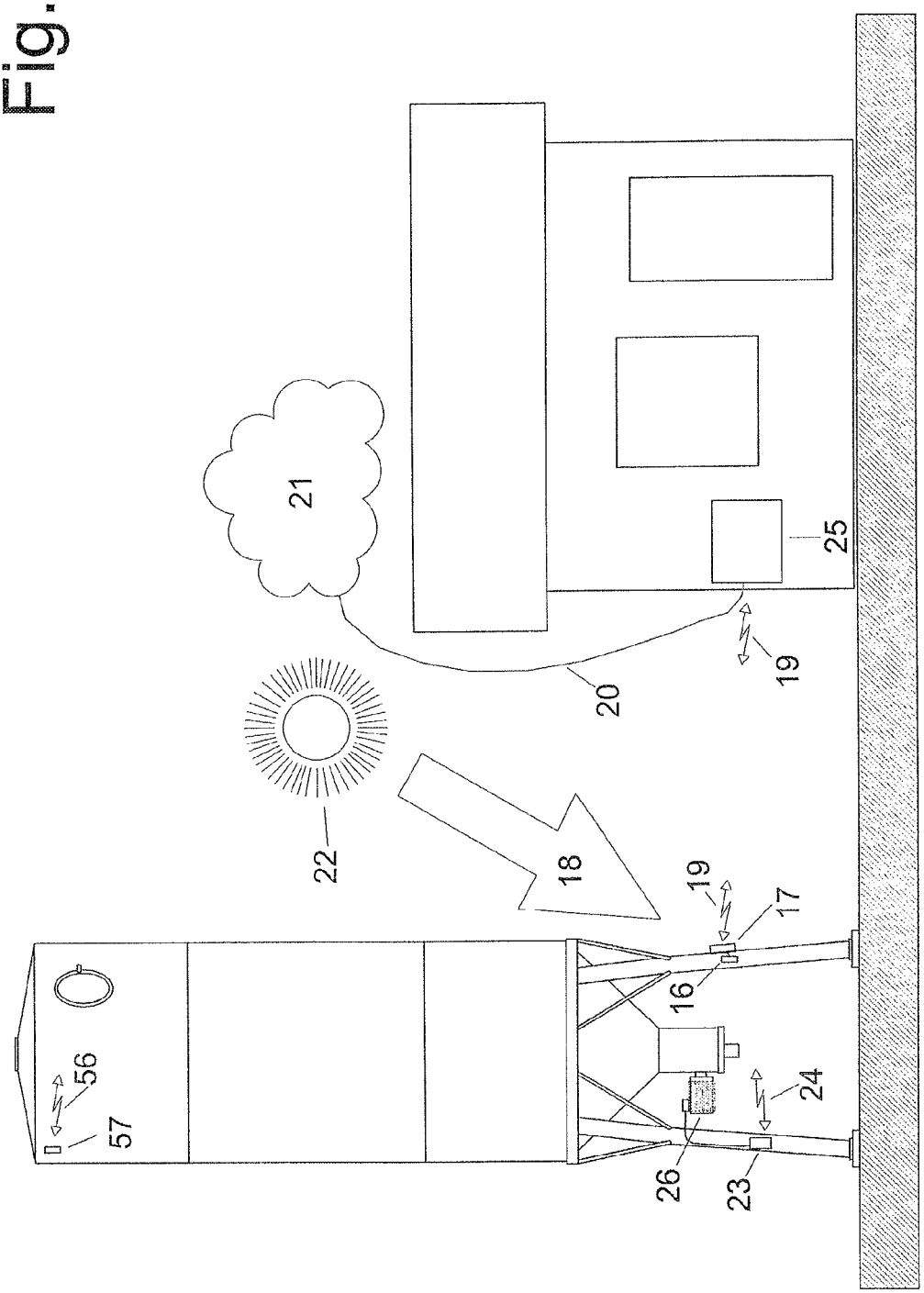
FIG. 3 shows a diagram of a silo in which the system object of the present invention has been installed. The invention eliminates the wiring and the power supply from the equipment. The load cells (16) are connected to the electronic equipment (17), which is powered by solar energy (18) from the sun (22). This equipment (17) is communicated via radio (19) with the electronic equipment of the cabin (25). The equipment of the cabin (25) has a connection (20) to the Internet (21). The invention has a second method for measuring the bulk material stock in the silo for monitoring the consumption. To that end it has a sensor (23) connected to the motor of the worm screw (26) which extracts the material from the silo. This sensor (23) measures the consumption of the motor and discriminates depending on the consumption of amperes thereof, when it is and when it is not extracting material. By integrating this information over time, it deduces the material that has been extracted from the silo and therefore the material remaining in the silo. The sensor (23) sends this information to the equipment (17) by means of radio communication (24).
Figure 4:
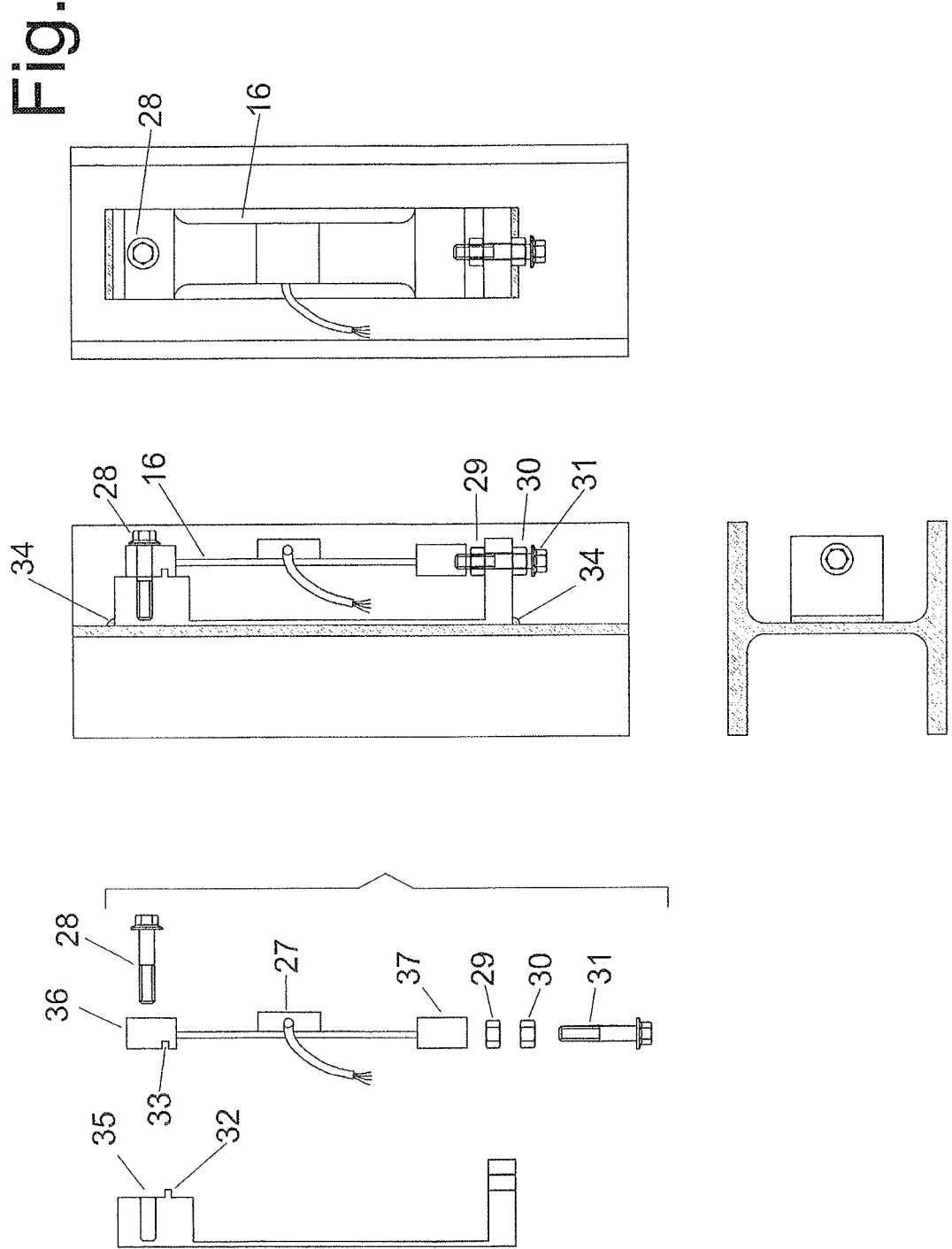
FIG. 4 shows a diagram of a load cell (16) installed on a leg of a silo which in this example is the web of an HEB 140 beam, as described in the present invention. This cell is screwed at one end (36) by means of the screw (28) to a support (35) which is welded to the web of the beam by means of weld beads (34). The support has a notch (32) which prevents displacement in cell shearing when it is inserted into a recess (33) of the load cell. At the other end of the cell (37), it is screwed (31) and fixed by means of nut (29) and locknut (30). The strain gauges formed by the cell are protected in a box (27) coated with a waterproof resin to prevent cell degradation.

The system is powered by solar energy (18) as a result of the photovoltaic panel (40). The system stores energy so that it can continue to operate at night by means of a set of supercaps (41).

The main microprocessor (39) detects the correct operation of the solar panel (40) as a result of an electronic stage (52), and it also detects the charge level in the supercaps as a result of the stage (42).

The solar panel (40) and the set of supercaps (41) are connected to an energy management unit (44) which in turn is connected to the general DC/DC power supply of the electronics (54). It also has a rapid recharging unit (43) for the supercaps by means of applying an external source (chute).

The system has an XYZ, accelerometer (46), a set of digital inputs and outputs (47), a PCD cell for measuring the brightness of the environment (48), a stage for adapting digital inputs (49) for a reed relay (51), and a stage for sensing the temperature of the system (50).

The system has a sensor which measures the pressure inside the silo (57) and which sends this pressure value by means of radio communication (56) to the microprocessor (39).

The system has a serial communication channel with a conversion stage via radio (45) which allows the system to communicate with other external devices.

DETAILED DESCRIPTION OF THE INVENTION

Figure 5:
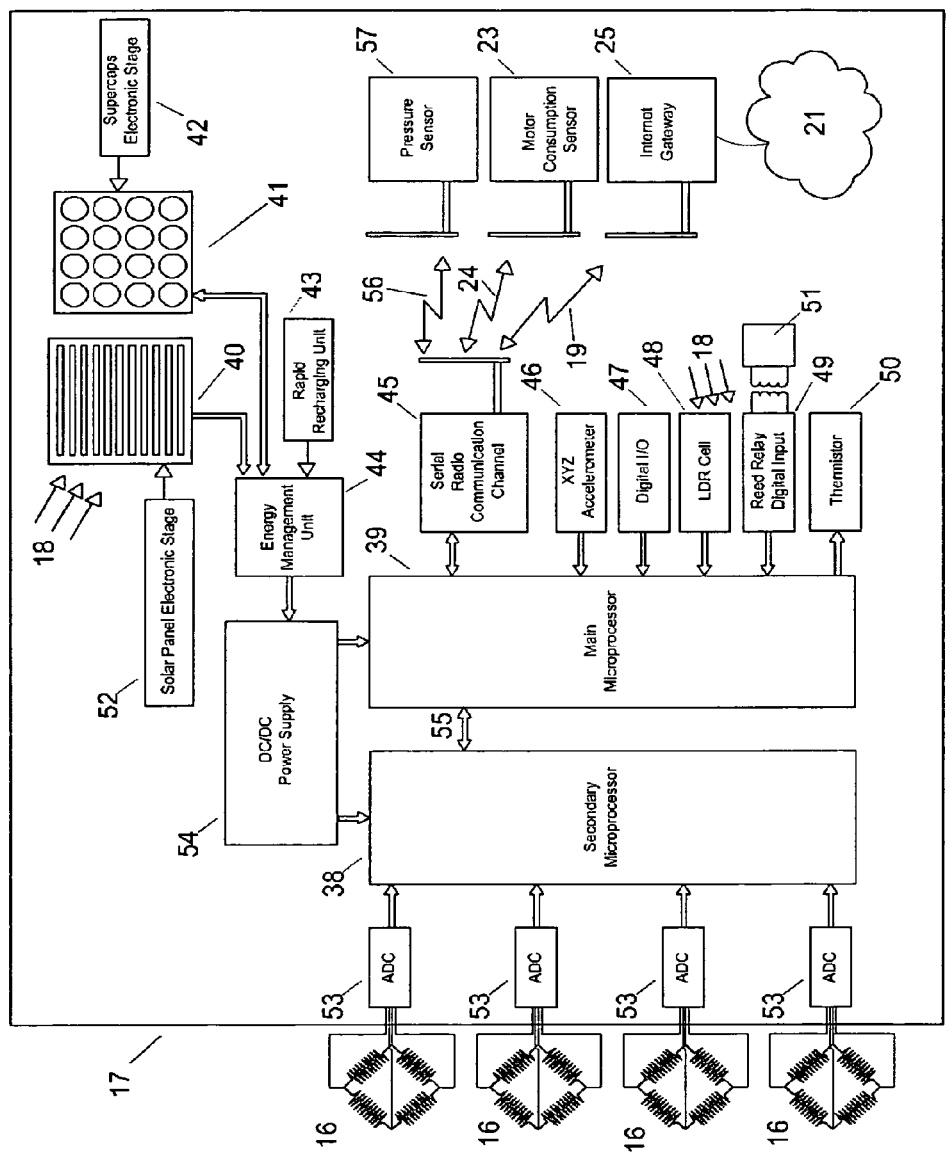
FIG. 5 shows a diagram of operational blocks for performing the system according to the present invention. The load cells (16) are connected to analog-to-digital converters (53) which further amplify the signals and take them to a secondary microprocessor (38) that is responsible for calculating and converting these tensions into weight. This microprocessor (38) is connected by means of (55) to the main microprocessor (39).

Embodiment of the system object of the present invention (FIG. 5)

A first preferred embodiment of the present invention will be detailed below. The system object of the present invention thus comprises the following elements:

Sensing the weight of the bulk material in the silo

This is performed with a set of load cells (16) which are installed on the legs (3) of the silo. A single load cell can be installed on one leg or up to four cells can be installed on the four legs.

The load cells are installed on the legs of the silo (3), but not in the current manner described (4), but rather as will be described in the present invention (16). To that end. instead of drilling, screwing and adhering the load cell to the web of the beam, a support (26) is welded to the web of the beam. Once the support is welded at both ends (34), the load cell (16) is screwed onto the support. The support has a notch (32) which engages with a groove (33) of the load cell assuring the immobility of the cell at the end when a tightening torque suited to the screw (28) is applied. Complete immobility of the cell on one of its sides is thus assured, without having to make precise boreholes and without having to use cementing adhesives. The other end of the cell is screwed onto the support (26) by means of another screw (31) using a nut (29) and a locknut (30).

This invention further allows the load cell to be electrically insulated by designing the ends of the cell (36) and (37) from insulating material, for example, from ceramic. A high number of breaks are prevented since the load cell is entirely electrically insulated from other metal parts of the installation. It is common for the cells to break in current installations due to electric storms or welding works in the installation. These breaks will be prevented by means of this improvement provided by the present invention.

This invention also prevents breaking and/or misadjusting the load cells as it allows them to be left free at one end by loosening the screw (31) and the nuts (29) and (30) during transport of the silo, therefore resolving and providing a solution to moveable silos which currently do not use load cells on the legs since they break from the impacts of positioning the silo.

Stage 1: Measuring the weight from the load cells

The set of load cells installed according to the present invention is connected to the electronic equipment (17) having four load cell inputs. The load cells are a set of strain gauges connected in a Wheatstone bridge which, when they are supplied with energy, for example at 0-10V, deliver an output voltage of +/−20 mV, proportional to the voltage to which they are subjected. These inputs are connected to adaptation, amplification stages (53) which in turn are connected to a microprocessor (38). The microprocessor (38) internally has at least four analog-to-digital converters and a firmware which scans the four mentioned A/D channels such that it senses the value of the tension in each of the load cells (16) and weight conversion is performed. Its firmware has a calibration process for adjusting the actual weight of the material in the silo to the value of the electric voltage delivered by the load cells.

Stage 2: Power supply through photovoltaic panel, supercaps and energy management system.

The system is supplied with a photovoltaic solar panel (40). Given that it is a low-consumption electronic, it is estimated that it is more than sufficient to supply the system with a 15×15 cm and 2 watt panel.

The photovoltaic panel is not sufficient as it does not work at night when light is absent, as the system must operate at all time. To that end, an energy storage means is necessary. For robustness purposes, instead of using rechargeable batteries a set of supercaps (41) is preferred. These supercaps will be charged from the solar panel from solar radiation and they will store electric energy which will be used at night. The electronic stage (41) is responsible for coordinating the different energy sources depending on the system status.

Stage 3: Built-in management application of the System.

One great innovation of the present invention is that the developed system comprises a built-in application which covers the entire functionality by firmware in two microprocessors (38) and (39), allowing the system to be self-sufficient, i.e. without the need to use computers or additional computational equipment, or central computational equipment. The users are connected by the Internet to (39) and this microprocessor implements a Web Server accessible from the Internet using standard technology.

To that end, the secondary microprocessor which manages the weighing (38) has a connection with the main microprocessor (39). For the embodiment, an SPI (Serial Peripheral Interface) type connection is selected, the secondary microprocessor (38) acting as slave and the main microprocessor (39) as master. The microprocessor (39) thus has access to the information of the weighing delivered to it (38).

The microprocessor (38) executes a firmware which implements the following functionality:

1.—Performing self-diagnostic operations of the weighing system based on the load cells.
2.—Handling up to 4 digital analog channels for converting the electric voltages in the cells to weight variables.
3.—Handling each load cell independently and performs digital summation thereof.
4.—Performing digital correlation operations for the signal that each load cell delivers, which allows it to detect if any of the cells is malfunctioning. In the event that this occurs, the malfunctioning cell can be digitally eliminated, this can be reported and the operation with the remaining cells can continue.
5.—By analyzing correlation deviations in the weighing, predicting the future malfunction in one or some of the load cells and reports by estimating when it will malfunction in the future, processing the gradient of degradation over time.
6.—Accepting commands of the main microprocessor (39) through the connection (55) which implements a slave SPI.

The microprocessor (39) executes the main firmware of the system by implementing the following functionality:

1.—Performing self-diagnostic functions of all the system components.
2.—Collecting the information from the weighing of (38) through the connection (55).
3.—Implementing a calibration application for the weighing, with a user interface through an Internet browser.
4.—Detecting the temperature of the system as a result of (50) and performing temperature compensations for adjusting the values of the weighing.
5.—Detecting, as a result of (48) the brightness of the room and checking that the photovoltaic panel is operating correctly. If it is not, generating alarms over Internet to report the malfunction.
6.—Allowing entering in system configuration mode by means of using reed relays (49) and (51).
7.—Calculating according to the material in the silo, the configuration data, the schedule for using the silo and the planned consumption demands, the time till the stock runs out, if the silo is or is not stocked, and reporting it through the Internet.
8.—Warning the user through Internet of significant stock variations that do not coincide with the demand planning foreseen and configured in the system.
9.—One of the features of the present invention is that this system can be installed at any time. The silo does not need to be empty. To that end, when the system is being configured, there is a need to simply enter the amount of bulk material of the silo in the system and apply tension on each of the cells by tightening the screw (31). The configuration application which runs in (39) will indicate the tension to be applied. The cells are thus placed in the operating interval, assuring the traceability of the system which simplifies and makes the calibration system more efficient. Currently, calibrating one of these systems in the prior art of this invention could take weeks as it depends on the availability of the plant and waiting for the time when the silo is empty. This calibration operation can be performed at any time and in less than half an hour as a result of this invention. This calibration can further be performed from anywhere, provided that a connection to the Internet is available.
10.—Detecting the position of the silo by means of the accelerometer. The silo must be completely vertical for it to operate reliably and safely. If the silo is moved, for example by a flash flood which debilitates the ground, the system will detect it and warn the user through Internet. Malfunctions of this type occur more commonly in moveable silos causing damages to the installation. In this case the system provides traceability that the silo was correctly positioned upon delivery.
11.—Maintaining a schedule for supplying material to stock the silo and since it has a real-time clock, detecting failures to supply material which is reported through Internet. In other words, it knows that stocking must occur on certain date and at a certain time. If it does not detect a surge pressure in the silo and increment in the stock in a confidence interval, it generates an alarm through Internet. If the amount increased after stocking is less than that ordered, within a confidence interval, it generates an alarm through Internet.
12.—Allowing the automatic generation of orders for stocking the silo through Internet in a B2B (business to business) environment depending on the established configuration, the demand planning and the material stock in the silo.
13.—Allowing tracking an SLA (Service Level Agreement) in which the manner in which the supplier will supply the material to stock the silo is controlled and agreed upon. The SLA is parameterized and is transformed into process variables and state machines linked to temporary events. The firmware of (39) maintains a task dedicated to tracking these events, which allows it to discriminate if the SLA is being complied with. In the case where failure to meet the SLA is detected, it informs the user through Internet.

14.—Maintaining radio communication (24) with equipment (23) which measures the electric consumption in the motor of the worm screw for extracting material from the silo. When the worm screw is extracting material, the electric consumption in the motor will be in an identifiable ampere interval. When the silo is empty, the energy consumption in amperes will be significantly lower. This proportions a second method for identifying that the silo is empty. The microprocessor (39) monitors this consumption and integrates it over time. It executes an algorithm which filters the motor stop and breakdown transients for the purpose of fine-tuning the integration of the consumption over time. It is furthermore possible to correlate it with the information from the weighing. This provides a second method for determining the weight in the silo which could be applied to silos not implemented with load cells.

15.—Detecting when the silo is being filled either by the increment of weight of material in the silo, or by detecting a surge pressure inside the silo by means of the sensor (57), which transmits this information via radio (56) to the microprocessor (39). It further detects that this pressure is within a range of appropriate values. If the truck is applying . more pressure than necessary for pneumatically tilling the silo, it can put the pipes or equipment of the silo at risk. Thus it detects whether the silo is correctly stocked.

16.—Implementing a sleeping mode and active mode cycle to the electronics for the purpose of saving electric consumption. When the electronics are in a sleeping mode the energy consumption is minimized. When they are in an active mode, the energy consumption is higher, it can even be greater than the 2 watts expected to be delivered by the 15×15 cm$^2$ photovoltaic panel. During this time, the supercaps secure the power supply. The working cycle allows the electronics to be in sleeping mode most of the time. The cycle is configurable by the user.

16.—Maintaining radio communication (19) with the communication gateway towards the Internet (25). The radio protocol chosen for the embodiment is a communication layer on a MAC 802.15.4. If there are many silos in mesh networking connected to the gateway, this gateway would act as coordinator and therefore ZigBee will be used on top of this MAC.

17.—The microprocessor (39) implements a built-in Web Server which allows access thereto through Internet, once the access control is overcome by means of user name and password. It also implements a management application for managing this Web Server, with the following functionality:

Calibrating the weighing system: weighing values for full silo, empty silo.

Calibrating consumption in the worm screw: Ampere interval when empty, when loaded, summation of times, breakdown and stop filtering.

Scheduling for the use of the silo. Determining optimal stocking time and of out-of-stock prevention.

Optimal stocking recommendation messages.

Consumption history record. Consumption trend graphs.

Alarms for consumption outside prefixed hour.

Alarms for filling the silo by other non-authorized suppliers.

Silo movement alarms.

Stage 4: Transmitting data via radio towards the communication gateway.

The microprocessor (39) maintains radio communication at 2.4 GHz implementing a MAC 802.15.4 protocol with the communication gateway (25). This is a short distance radio communication, maximum 300 meters outdoors in a free band, therefore a license for use is not necessary.

Stage 5: Transmitting data from the communication gateway towards any equipment connected to the Internet.

The communication gateway (25) is installed in the control cabin. It has a physical connection to the electric network for the power supply and ADSL connection towards the Internet (21). It implements a gateway with protocol conversion which transfers everything reaching it via radio towards Internet ADSL and everything reaching it from the Internet ADSL towards the radio. It thus puts the management system for the silo on the Internet.

The invention claimed is:

1. A management system for managing bulk material inside a silo, characterized in that it comprises:
    A set of load cells (16) screwed onto supports (35) that are welded to the legs of the silo and the tension of which can be controlled by tightening or loosening a screw (31);
    Electronic equipment (17) which measures the tension in the cells, calculates the weight of the material in the silo and transmits it via radio towards a communication gateway (25) which links it to the Internet;
    A photovoltaic solar panel which supplies the system with solar energy and eliminates the power supply from the equipment to the electric network;
    A set of supercaps which store electric energy allowing the system to operate in periods where light is absent and prevents using batteries that may deteriorate over time;
    An accelerometer which allows measuring if the silo is moved and its inclination;
    a thermistor (48) with signal adaptation towards an analog input of the microprocessor (39) so that the electronic equipment can measure the room temperature and perform temperature compensation calculations in the measurement of the load cells;
    a real-time clock which allows the microprocessor (39) to measures lapses of time and record events with date, hour, minutes and seconds;
    a serial communication channel with a conversion stage via radio (45) which allows the system to communicate with other external devices;
    an electronic unit (44) for managing the energy which rations the use of this energy and allows prolonging the duration of the energy stored in the supercaps (19).

2. The system according to claim 1, characterized in that it can by itself warn the user at any time of the out-of-stock risk, i.e., that the silo is void of material, according to how it has been configured by the user.

3. The system according to claim 1, characterized in that it can by itself alert the user of stock variations that are considered significant at any time to the user, according to how they have been configured by the user.

4. The system according to claim 1, characterized in that it can be installed and calibrated at any time and without needing to wait to empty and/or fill the silo.

5. The system according to claim 1, characterized in that it can be calibrated and/or operated from any place in the world, provided that it has a connection to the Internet.

6. The system according to claim 1, characterized in that it detects if the silo is in a vertical, horizontal, or intermediate position, and if it is being moved, as occurs during transport and/or in that it transmits this information to the user.

7. The system according to claim 1, characterized in that it informs the user when the silo is not vertical enough to operate, preventing falls.

8. The system according to claim 1, characterized in that it allows releasing the tension of each load cell by simply loosening one of the screws (31) which fixes it due to the fact that the latter does not have to be installed in an adhered manner and the breakage thereof during transport is thus prevented.

9. The system according to claim 1, characterized in that it detects operation malfunctions in one or several of the load cells installed, tracking a measurement correlation interval configurable by the user, and informs the user of the malfunction.

10. The system according to claim 1, characterized in that it detects possible degradations over time in the load cells installed in the silo, predicting when in the future they are going to malfunction and transmits it to the user.

11. The system according to claim 1, characterized in that it can be configured so that it tracks the supplies of the bulk material with which the silo is filled, and can thus detect failures in the supply of said material and inform the user of it.

12. The system according to claim 1, characterized in that it can be configured to automatically place the order with the supplier of the bulk material to till the silo through the Internet.

13. The system according to claim 1, characterized in that it can be configured to track a possible SLA (Service Level Agreement) signed between the operator of the silo and the supplier supplying material to the silo, and automatically inform one of the parties or both of them of the failures in the supply regulated by the mentioned agreement.

14. The system according to claim 1, characterized in that it allows installing load cells in the legs of the moveable silos without breaking them during the transport and commissioning of the silo, al it allows performing these operations leaving the load cells free on one of the sides.

15. The system according to claim 1, characterized in that it allows adjusting the force tension during the commissioning of the silo to a value in each load cell to achieve measurement repetitiousness in use thereof.

16. The system according to claim 1, characterized in that in addition to measuring the weight of the material in the silo, it estimates the silo fill level by integrating the electric consumption of the motor for extracting material from the silo.

17. The system according to claim 1, characterized in that in addition to measuring the weight of the material in the silo, it detects if the silo is empty by measuring the electric consumption of the motor for extracting material from the silo.

18. The system according to claim 1, characterized in that in addition to measuring the weight of the material in the silo, it detects if the silo is being filled by measuring the surge pressure occurring inside the silo when a truck is filling it.

19. The system according to claim 1, characterized in that it detects if the silo is being subjected to an excessive pressure at the time of the supply and reports it through the Internet.

20. The system according to claim 1, characterized in that it follows a cycle configurable by the user wherein the electronic is put in a sleep mode and active mode to save electric energy.

21. The system according to claim 1, characterized in that the load cells installed are entirely electrically insulated, which allows protecting them from surge voltages that may appear in the environment, such as for example voltages generated due to storms.

* * * * *